United States Patent
Northam et al.

(10) Patent No.: US 9,884,677 B2
(45) Date of Patent: Feb. 6, 2018

(54) WING TIP POD

(75) Inventors: Robert Northam, Bristol (GB); Neil Lyons, Bristol (GB)

(73) Assignee: Airbus Operations Limited, Bristol (GB)

( * ) Notice: Subject to any disclaimer, the term of this patent is extended or adjusted under 35 U.S.C. 154(b) by 985 days.

(21) Appl. No.: 13/424,761

(22) Filed: Mar. 20, 2012

(65) Prior Publication Data

US 2012/0248255 A1 Oct. 4, 2012

(30) Foreign Application Priority Data

Mar. 28, 2011 (GB) .................................. 1105108.3

(51) Int. Cl.
*B64C 23/06* (2006.01)

(52) U.S. Cl.
CPC ........... *B64C 23/065* (2013.01); *Y02T 50/164* (2013.01)

(58) Field of Classification Search
CPC .................................................. B64C 23/065
USPC ................................ 244/199.2, 199.4, 200.1
See application file for complete search history.

(56) References Cited

U.S. PATENT DOCUMENTS

| | | | | |
|---|---|---|---|---|
| 2,596,139 | A * | 5/1952 | Fletcher | 244/130 |
| 2,984,439 | A * | 5/1961 | Fletcher | 244/130 |
| 4,247,063 | A * | 1/1981 | Jenkins | 244/91 |
| 4,455,004 | A * | 6/1984 | Whitaker, Sr. | 244/90 R |
| 5,039,032 | A * | 8/1991 | Rudolph | B64C 3/10 |
| | | | | 244/124 |
| 5,322,242 | A * | 6/1994 | Tracy | 244/36 |
| 5,490,001 | A * | 2/1996 | Konuma | 349/86 |
| 5,702,071 | A * | 12/1997 | Kroll | B64C 23/065 |
| | | | | 244/199.3 |
| 5,934,612 | A * | 8/1999 | Gerhardt | B64C 23/065 |
| | | | | 244/199.3 |
| 6,345,790 | B1* | 2/2002 | Brix | 244/199.4 |
| 7,322,546 | B2* | 1/2008 | Snow et al. | 244/172.3 |
| 8,439,310 | B2* | 5/2013 | Cazals et al. | 244/135 R |
| 8,453,974 | B1* | 6/2013 | Thumann | B64C 7/00 |
| | | | | 244/130 |
| 2006/0076460 | A1* | 4/2006 | Snow et al. | 244/199.2 |

FOREIGN PATENT DOCUMENTS

| | | | | |
|---|---|---|---|---|
| EP | 1616787 | A1 * | 1/2006 | ............ B64C 23/06 |
| FR | 2906220 | A1 * | 3/2008 | ........... B64C 23/065 |
| GB | 1 087 784 | | 10/1967 | |

OTHER PUBLICATIONS

"Laminar Flow Airfoil", 1996, aviation-history.com, <http://www.aviation-history.com/theory/lam-flow.htm>, archived Feb. 3, 1999.*
"Wingtip device", Wikipedia, <http://en.wikipecia.org/wiki/Wingtip_device>, archived Feb. 15, 2009.*
Search Report for GB 1105108.3, dated Jul. 14, 2011.

* cited by examiner

*Primary Examiner* — Tien Q Dinh
*Assistant Examiner* — Michael H Wang
(74) *Attorney, Agent, or Firm* — Nixon & Vanderhye P.C.

(57) ABSTRACT

A natural-laminar-flow swept transonic wing fitted with a wing tip pod for controlling the location of a wing shock in the wing tip region, such that the shock extends outboard substantially up to the wing tip without substantially sweeping forward toward the wing tip leading edge.

18 Claims, 6 Drawing Sheets

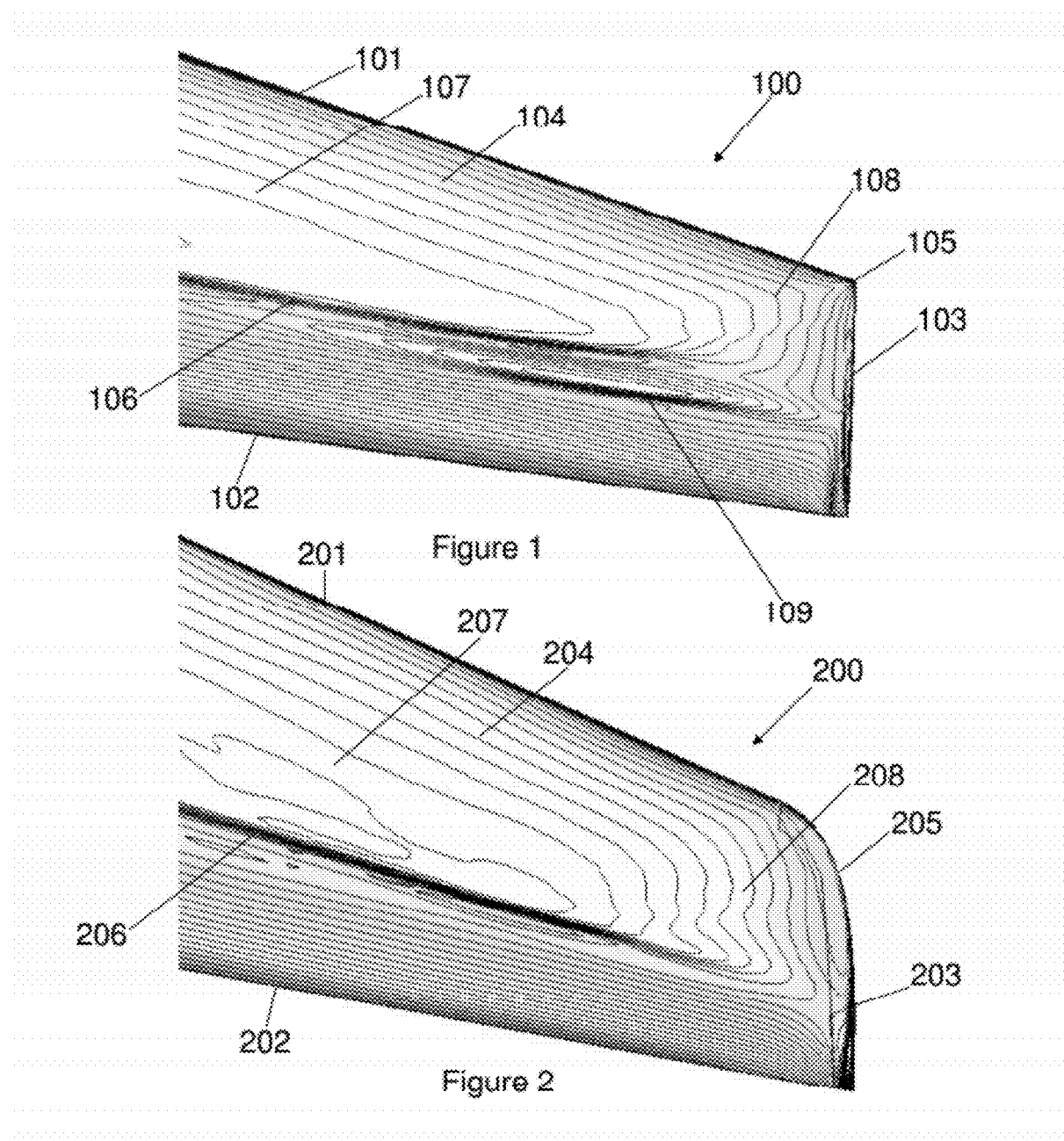

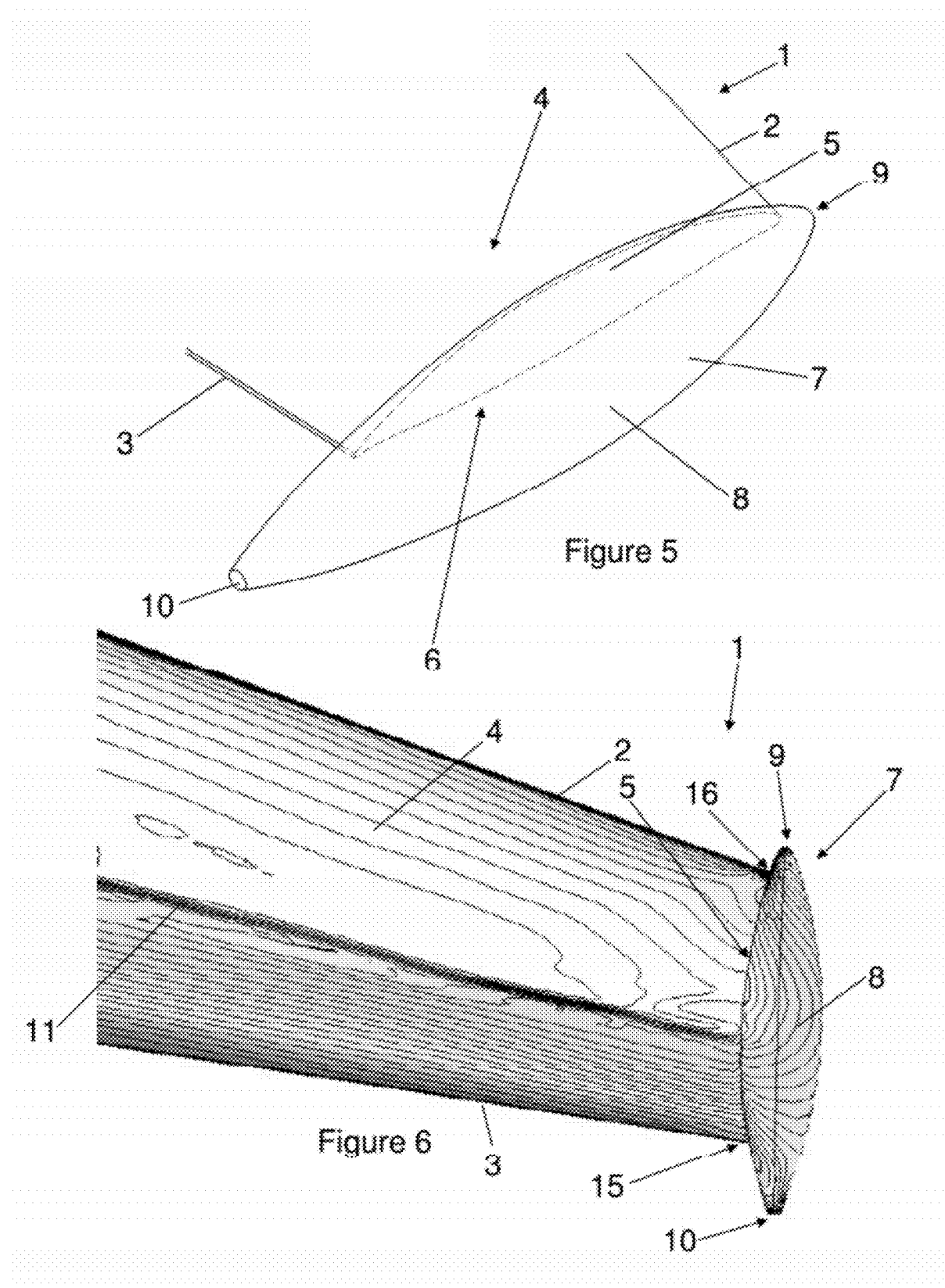

*Chordwise Profile*

*Planform Profile*

*Cross Sectional Profile*

WING TIP POD

This application claims priority to GB Patent Application No. 1105108.3 filed 28 Mar. 2011, the entire contents of each of which are hereby incorporated by reference.

FIELD OF THE INVENTION

The present invention relates to an aircraft wing tip pod. In particular, the invention relates to a natural-laminar-flow swept transonic wing fitted with a wing tip pod.

BACKGROUND OF THE INVENTION

For a swept transonic wing, the compression wave set up by the sharp leading edge corner at the wing tip tends to pull the wing shock (if present) forward in the wing tip region. For natural-laminar-flow (NLF) applications this limits the extent of laminar flow that can be achieved despite being in a favourable region of the wing in terms of local Reynolds number and loading where boundary layer transition is normally governed by shock location and not boundary layer instability.

Wing section design and wing tip treatment, such as rounding of the wing tip leading edge (a so-called "Kuchemann tip"), softens the compression wave from the wing tip leading edge and slightly improves the spanwise extent of NLF. However, it has so far not been possible to overcome the tip flow physics and improve NLF spanwise extent to a satisfactory level.

SUMMARY OF THE INVENTION

A first aspect of the invention provides a natural-laminar-flow swept transonic wing for an aircraft and having an upper surface, a lower surface, a leading edge, a trailing edge, an inboard root and an outboard tip fitted with a wing tip pod having an elongate body which tapers forwardly to a nose and tapers rearwardly to a tail, the nose being disposed forward of the wing tip leading edge and the tail being disposed aft of the wing tip trailing edge, wherein the wing tip pod body has a convex outer surface facing inboard from its intersection with the wing tip upper surface, and the wing tip pod body has an edge profile adjacent the wing upper surface that in plan view extends from nose to tail without inflection and reaches a maximum inboard position, with respect to the wing tip chord, intermediate the wing leading and trailing edges, such that when the wing is flown at a Mach number close to its cruise optimised design point a region of natural-laminar-flow over the wing upper surface is obtained forward of a generally spanwise shock, which extends outboard substantially up to the wing tip without substantially sweeping forward toward the wing tip leading edge.

The invention is advantageous in that the addition of the wing tip pod has the effect of increasing the region of NLF adjacent the wing tip. Compared with a typical swept transonic wing with standard tip rounding, which causes the shock to sweep forward towards the wing tip leading edge, the wing tip pod has the effect of controlling the shock position at the wing tip and fixing this in line with the shock inboard of the tip region. The further aft shock position at the wing tip allows local pressure distributions favourable for achieving NLF to be developed. The boundary layer transition line tends to move aft in line with the shock movement. Accordingly, the region forward of the shock which can provide NLF can be extended up to the wing tip. Studies have shown the spanwise increase in the useful NLF region to be of the order of 1 meter compared with a typical wing having a Kuchemarm tip.

Control of shock strength through wing tip bodies is well documented. For example, U.S. Pat. No. 2,984,439 and U.S. Pat. No. 6,149,101 describe body shapes that are used to reduce shock strength (and therefore wave drag) for high speed applications through area ruling and body 'waisting'. However, these documents do not describe a tip body shaped to control the position of the shock in the wing tip region of a typical NLF wing.

As opposed to the effect of the bodies described in U.S. Pat. No. 2,984,439 and U.S. Pat. No. 6,149,101, the wing tip pod of the present invention is likely to increase slightly the local shock strength and hence wave drag. However, the increased region of NLF provides a reduction in the viscous drag on the laminar wing.

The wing tip pod preferably has no waisted region. That is to say, the wing tip pod has a cross sectional area that increases from the nose to a maximum and then decreases towards the tail.

The wing tip pod may have a cross-section profile with a minimum radius of curvature sufficiently large to promote attached flow as far forward on the wing tip pod as possible. This helps to ensure that separated flow does not impinge on the laminar area of the wing.

The wing tip pod may have a cross-section profile with a greater proportion of its volume above the wing than below the wing.

The wing tip pod may have a cross-section profile with a greater proportion of its volume further outboard than inboard.

The wing tip pod may have a greater proportion of its volume aft of the maximum inboard position of the wing tip pod edge profile.

The wing tip pod may be blended with and into the wing.

The wing tip pod may have a cross-section shape which varies along the length of the pod.

The maximum inboard position of the wing tip pod edge profile may be substantially coincident with the generally spanwise shock feature at design conditions.

The maximum inboard position of the wing tip pod edge profile may be disposed at between approximately 35% to 70% of the wing tip chord.

The wing tip pod may have a substantially circular, or semi-circular, cross-section profile. Alternatively, the wing tip pod may have a substantially elliptical, or semi-elliptical, cross-section profile.

The nose of the wing tip pod may extend forward of the wing tip leading edge by a distance substantially less than the distance between the wing tip trailing edge and the tail of the wing tip.

The nose of the wing tip pod preferably extends forward of the wing tip leading edge by a distance less than 10% of the wing tip chord.

A second aspect of the invention provides an aircraft having the wing according to the first aspect.

BRIEF DESCRIPTION OF THE DRAWINGS

Embodiments of the invention will now be described with reference to the accompanying drawings, in which:

FIG. 1 illustrates pressure coefficient contours over a typical swept transonic laminar flow aircraft wing with no wing tip treatment showing how the wing shock is pulled forward towards the sharp leading edge corner in the wing tip region thus reducing the spanwise extent of the laminar flow region;

FIG. 2 illustrates pressure coefficient contours over a typical swept transonic laminar flow aircraft wing with a standard Kuchemann (rounded) wing tip showing how the wing shock strength is softened in the wing tip region compared with FIG. 1, but with only marginal improvement in the spanwise extent of the laminar flow region;

FIG. 5 illustrates a wing tip pod fitted to the wing tip of a swept transonic laminar flow aircraft wing in accordance with the invention;

FIG. 6 illustrates pressure coefficient contours over the wing of FIG. 5 showing how the wing tip pod controls the shock position at the wing tip and fixes this in line with the shock inboard of the tip region, thus increasing the region of natural laminar flow up to the wing tip;

DETAILED DESCRIPTION OF EMBODIMENT(S)

Figure 3:
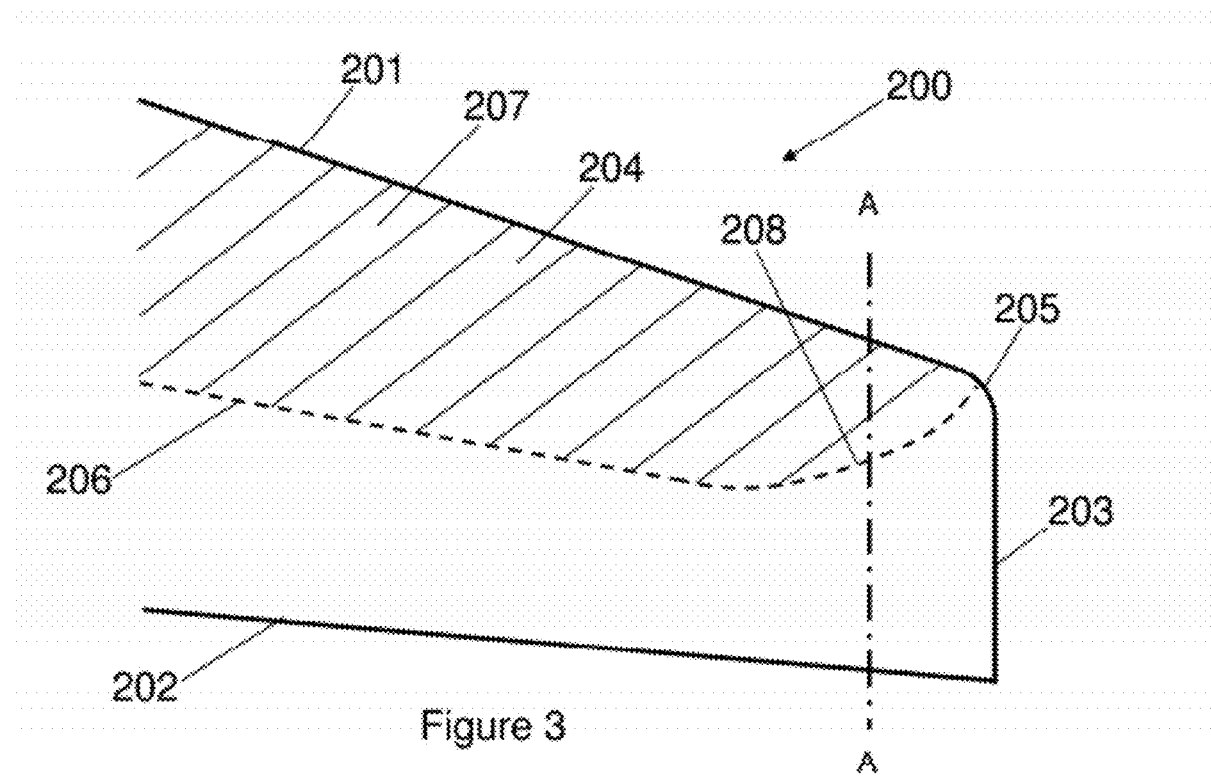
FIG. 3 illustrates schematically the shock location (shown in dotted line) over the wing of FIG. 3 and the region of natural laminar flow (shown in hatched line) typically limited by the shock.

FIG. 1 illustrates the outboard end of a typical swept transonic laminar flow aircraft wing 100. The wing 100 has a leading edge 101, a trailing edge 102 and a wingtip 103. The wing 100 has an aerofoil section configured to promote natural laminar flow and is characterised by a relatively thin aerofoil section, a relatively small radius at the leading edge 101, and with a maximum thickness relatively further aft than for a conventional aerofoil. Considerable variation in aerofoil profiles exist for natural laminar flow wings but one of the primary design considerations is to provide laminar flow over up to approximately 35% to 70% of the wing chord.

The wing 100 has no wing tip treatment and so the leading edge 101 forms a sharp corner 105 with the wing tip 103.

In the planform view of FIG. 1, pressure coefficient, $C_p$, contours over the wing 100 are observed at M=0.75 and a wing shock 106 is visible extending substantially spanwise at approximately the 55% to 60% chord line. A natural laminar flow region 107 is observed forward of the shock 106.

The sharp leading edge corner 105 creates a compression wave which tends to pull the wing shock 106 forward in the tip region. The spanwise extent of the wing shock 106 becomes limited by isotropic compression 108 in the tip region. The tip region therefore does not provide flow conditions (pressure gradients) favourable for the natural laminar flow region 107 to extend spanwise up to the wing tip 103.

This reduction in the upper surface of the wing 100 in which natural laminar flow can occur has the effect of increasing the profile drag on the wing 100. Furthermore, a secondary shock 109 is observed creating a "double shock" which has the additional disadvantage of increased wave drag. Whilst it is possible to design against the formation of a double shock, the combination of increased profile drag and increased wave drag can be attributed to the presence of the sharp leading edge corner 105.

FIG. 2 illustrates a typical swept transonic laminar flow aircraft wing 200 having a leading edge 201, a trailing edge 202, a wing tip 203 and an upper wing surface 204. The wing 200 has a standard Kuchemann rounded wing tip 205.

The Kuchemann tip shape 205 has the effect of softening the compression wave from the wing tip leading edge as compared with the sharp corner 105 for the wing 100. This has the effect of eliminating the double shock observed for the wing 100 but the shock 206 is still drawn forwardly in the tip region towards the wing tip leading edge. Isotropic compression 208 in the tip region continues to limit the region of natural laminar flow 207 which is typically limited by the shock location.

Although the wave drag for the wing 200 is reduced as compared with that for the wing 100 shown in FIG. 1, the region favourable for natural laminar flow 207 is increased only slightly in the spanwise direction as compared with the region 107 for the wing 100. Accordingly, the viscous drag for the wing 200 is only marginally reduced.

FIG. 3 illustrates schematically the location of the shock 206 (indicated by broken line) over the upper aerodynamic surface 204 of the wing 200 and the region of natural laminar flow 207 (indicated by hatching) which is typically limited by the shock 206. With appropriate selection of the aerofoil profile, the local pressure distributions favourable for achieving natural laminar flow to be developed can extend up to the location of shock 206. The boundary layer transition line will tend to be coincident with the location of the shock 206. Due to the compression wave from the rounded Kuchemann tip 205, the shock 206 tends to sweep forwards in the tip region.

Figure 4:
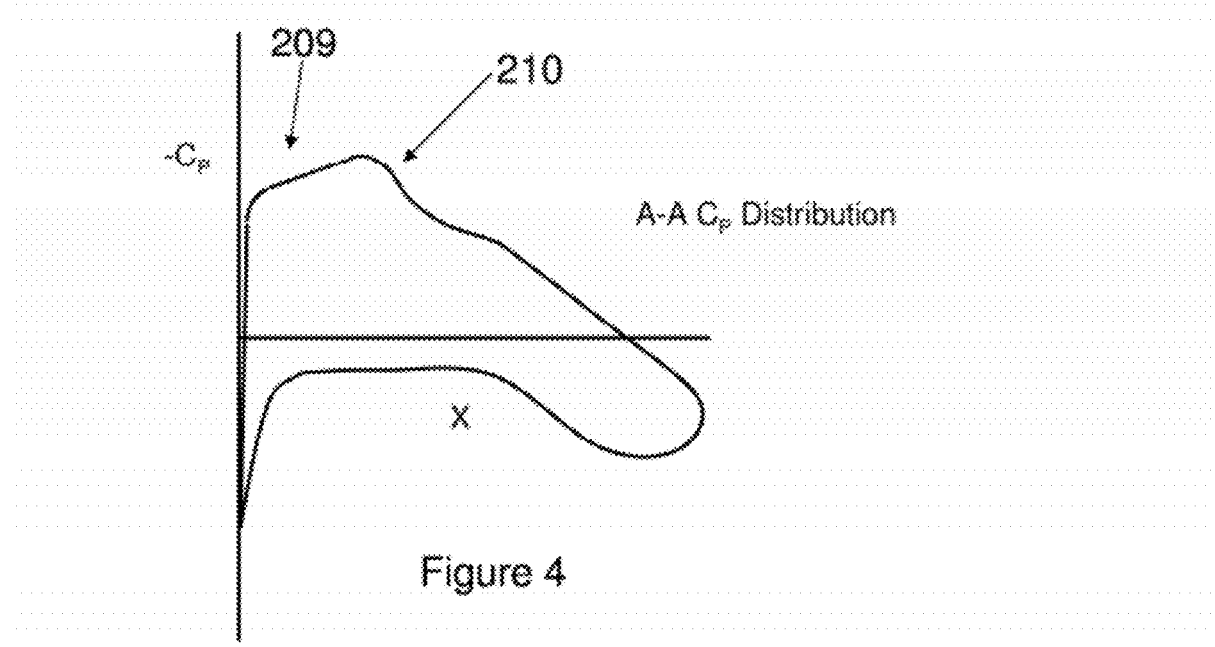
FIG. 4 illustrates the pressure coefficient, $C_p$, distribution over chord line A-A in FIG. 3.

FIG. 4 illustrates the local static pressure coefficient distribution, $C_p$, along chord line A-A of FIG. 3. The horizontal axis denotes the distance X from the leading edge 201 to the trailing edge 202. A favourable local pressure gradient for achieving natural laminar flow is indicated by reference numeral 209 and a relatively weak shock is indicated by reference numeral 210 in FIG. 4. As can be seen, the strength of the forward swept shock 206 in the tip region is relatively weak but the chordwise extent of favourable local pressure distributions for achieving natural laminar flow to be developed is curtailed by the forward swept shock 206 in the tip region.

FIG. 5 illustrates a natural laminar flow swept transonic aircraft wing 1 in accordance with an embodiment of the present invention. The wing 1 has a leading edge 2, a trailing edge 3, an upper aerodynamic surface 4, a wing tip 5 and a lower aerodynamic surface 6. The wing 1 has an inboard root (not shown) at the opposite end of the wing to the outboard tip 5.

The wing 1 is fitted with a wing tip pod 7 having an elongate body 8 which tapers forwardly to a nose 9 and tapers rearwardly to a tail 10. The nose 9 is rounded and its forward most extent is located just forward of the wing tip leading edge 16. The tail 10 is slightly truncated and is disposed aft of the wing tip trailing edge 15.

FIG. 6 illustrates a plan view of the wing 1 showing pressure coefficient contours over the upper wing surface 4. The pressure coefficient contours are illustrated at M=0.75, the same as for FIGS. 1 and 2, and the laminar flow aerofoil section used in the wing 1 is identical to that used in the wings 100 and 200 depicted in FIGS. 1 and 2.

A wing shock 11 is clearly visible in FIG. 6 extending spanwise along the approximately 55% to 60% chord line. Importantly, the effect of the shape of the body 8 of the wing tip pod 7 is to control the position of the shock 11 in the tip region and fixes the shock location in the tip region in line with the shock location inboard of the tip region.

The shape of the wing tip pod body 8 is important for controlling the position of the shock 11 in the tip region and this will be described in greater detail below. Advantageously, the further aft shock position in the tip region allows local pressure distributions favourable for achieving natural laminar flow to be developed forward of the shock location. The boundary layer transition line tends to move aft in line with the shock movement, improving the extent of natural laminar flow in the wing tip region.

Figure 7:
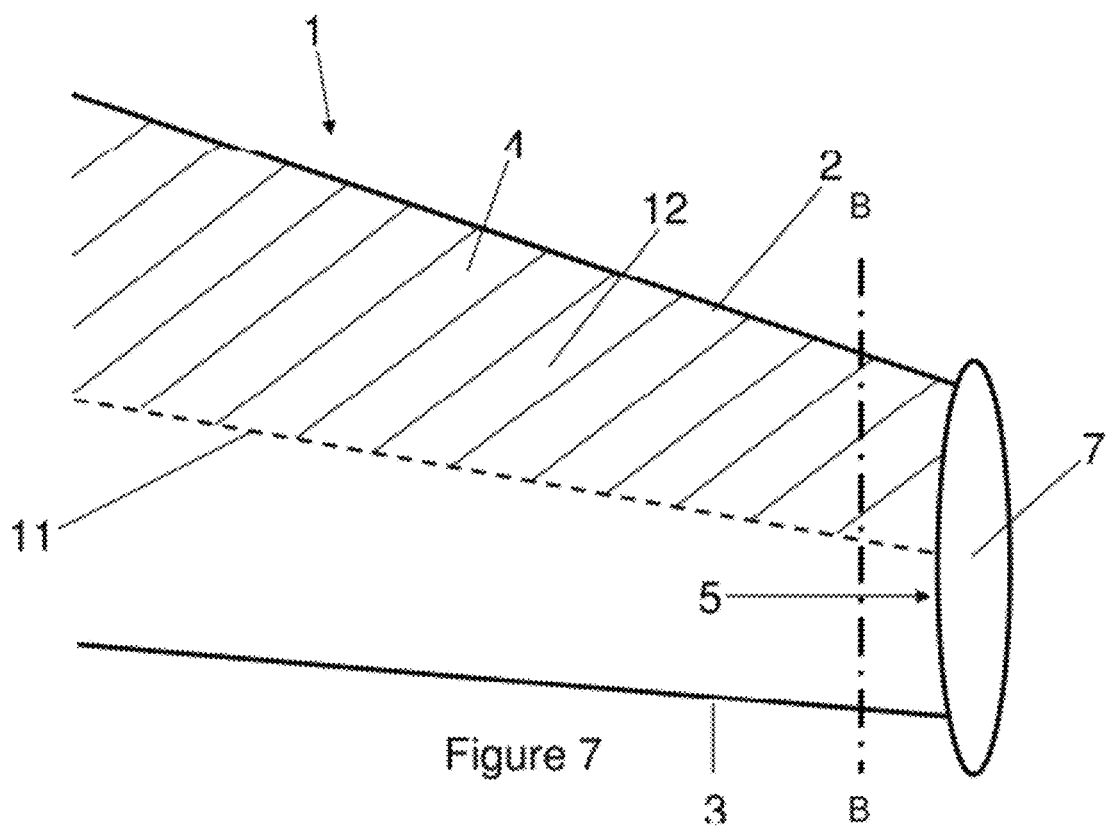
FIG. 7 illustrates schematically the shock location (shown in dotted line) over the wing of FIG. 6 and the region of natural laminar flow (shown in hatched line) typically limited by the shock.

FIG. 7 illustrates schematically the wing 1 in planform showing the location of the shock 11 extending up to the wing tip 5. The region favourable for achieving natural laminar flow to be developed is indicated by the hatched area forward of the shock location 12. The natural laminar flow region is indicated by reference numeral 12. Comparing FIG. 7 with FIG. 3 it is evident that the region 12 favourable for developing natural laminar flow is more extensive than the corresponding region 207 shown in FIG. 3.

Figure 8:
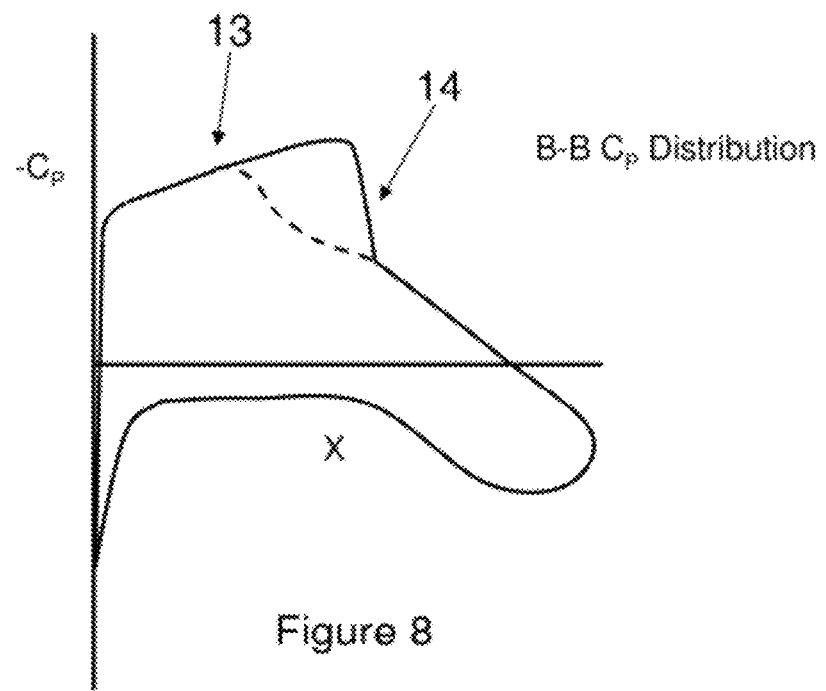
FIG. 8 illustrates the pressure coefficient, $C_p$, distribution over chord line B-B in FIG. 7.

FIG. 8 illustrates a local static pressure coefficient distribution, $C_p$, along line B-B in FIG. 7. The broken line in FIG. 8 is an overlay of the corresponding pressure distribution depicted in FIG. 4. It can be seen from FIG. 8 that the effect of fixing the location of the shock 11 in the tip region at a further aft location, as compared with the wing 200, by addition of the wing tip pod 7 increases the chordwise extent over which a favourable pressure distribution 13 is created over the upper wing surface 4, and also shows how the strength of the shock 11 is increased in the tip region. The shock is indicated by reference numeral 14 in the pressure coefficient distribution in FIG. 8.

It is important to note that the addition of the wing tip pod 7 is unlikely to reduce the local shock strength, which in fact is likely to increase and cause a corresponding increase in wave drag. However, increasing the spanwise extent of the region 12 over which the local pressure distributions are favourable for achieving natural laminar flow to be developed has the effect of reducing viscous drag over the wing 1.

Figure 9A:
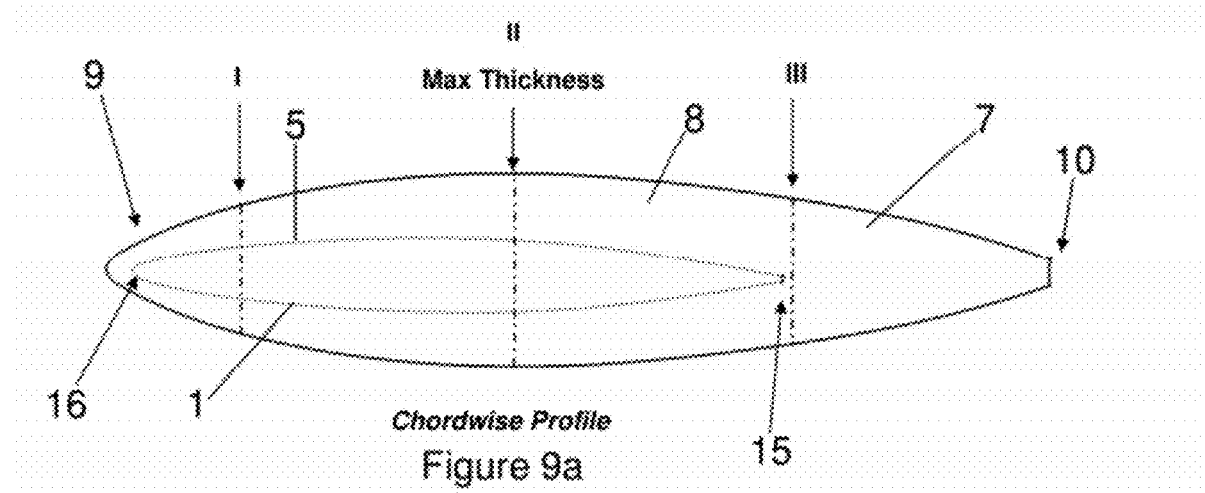
FIGS. 9a, 9b and 9c illustrate a chord-wise profile, a planform profile and a cross sectional profile, respectively, of the wing tip pod of FIG. 5.

FIG. 9a illustrates the chordwise profile of the wing tip pod 7 viewed looking outboard with the aerofoil section of the wing 1 at the wing tip 5 indicated in shadow line. As can be seen, the wing tip pod body 8 has a thickness which continuously increases from the rounded nose 9 to reach a maximum thickness at section II. The section II substantially corresponds to the spanwise location as a percentage of the wing chord at which the wing shock 11 develops inboard of the wing tip at cruise optimised design conditions. In this particular embodiment, with the wing shock 11 being located at the approximately 55% to 60% chord line, the section of maximum thickness II of the wing tip pod 7 is substantially coincident with the 55% to 60% chord position at the wing tip 5.

From the maximum thickness section II the wing tip pod body 8 has a continuously decreasing section and thickness to the truncated tail 10. Section III is substantially coincident with the wing tip trailing edge 15. Section I is disposed forward of the maximum thickness section II by a distance equivalent to the distance between sections II and III.

It is apparent from FIG. 9a that the nose 9 of the wing tip pod 7 is disposed just forward of the wing tip leading edge 16, whereas the wing tip pod tail 10 is disposed significantly further aft of the wing tip trailing edge 15. It is particularly beneficial that the wing tip pod nose 9 is disposed only just forward of the wing tip leading edge 16. As mentioned above, the wing tip pod body 8 reaches a maximum thickness and section at approximately 55% to 60% of the wing tip chord. In order to minimise flow separation effects, the wing tip pod body 8 is designed so as to have a taper towards the tail 10 with a greater distance between section II and the tail 10 than between section II and the nose 9. Accordingly, the tail 10 extends relatively further aft of the wing tip trailing edge 15.

Figure 9B:
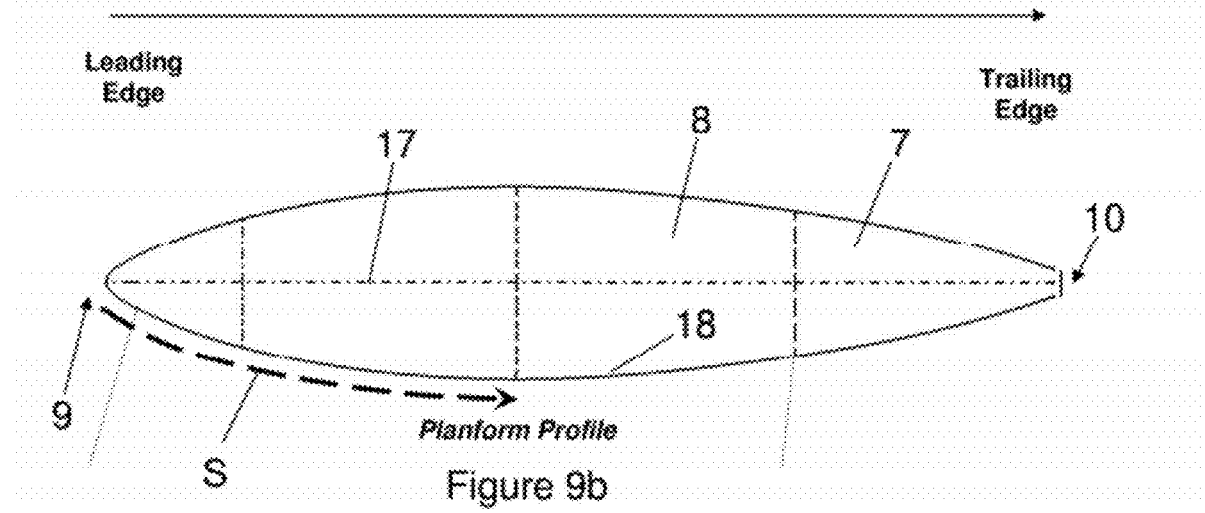

FIG. 9b illustrates the planform profile of the wing tip pod 7. The wing tip pod 7 had a centreline 17 extending from the nose 9 to the tail 10. In this particular embodiment, the centreline 17 is linear, although in other embodiments it may be curved. The centreline 17 is aligned with the fore-aft direction, i.e. parallel to the aircraft longitudinal axis.

Positioning the nose 9 of the wing tip body 7 just forward of the wing tip leading edge 16 causes the local airflow over the upper wing surface 4 to accelerate in the tip region. As can be seen in the planform profile of FIG. 9b, the wing tip pod body 8 has an edge profile 18 adjacent the wing upper surface 4 that extends from the nose 9 to the tail 10 without inflection and reaches a maximum inboard position at section II. In this embodiment, the wing tip pod body 8 is a volume of revolution about the axis 17 and so the section II also corresponds to the maximum width of the wing tip pod body 8.

By designing of the shape of the wing tip pod body 8 such that the edge profile 18 reaches its maximum inboard position (relative to the wing tip chord) at section II, the airflow over the wing upper surface 4 adjacent to the wing tip pod is continuously accelerated from adjacent the nose 9 to the maximum inboard position of the edge profile 18.

This constantly accelerating airflow (indicated by arrow S in FIG. 9b) sets up a favourable pressure gradient over the upper wing surface in the tip region up to the maximum width section II. Advantageously, section II is located at the wing tip chord position substantially corresponding to the inboard wing shock chordwise location. The maximum width section II has the effect of stabilizing the location of the wing shock in the tip region and fixes the wing shock in the tip region substantially in line with the inboard wing shock 11 location.

The shape of the wing tip pod body 8 is selected so as to ensure that in the tip region the wing shock location is fixed at a desired aft position, such that a favourable pressure gradient may be set up forward of the wing shock at the cruise optimised design conditions. This can provide flow conditions favourable for natural laminar flow in the tip region forward of the wing shock 11 with only a marginal increase in wave drag as compared with the prior wing design shown in FIG. 3 with Kuchemann tip rounding.

Figure 9C:
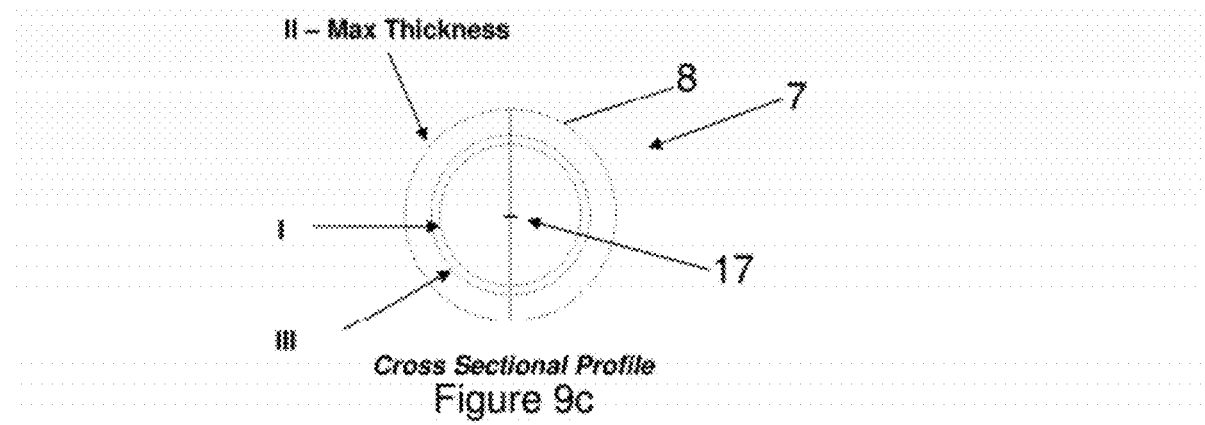

FIG. 9c shows the cross sectional profile of the wing tip pod body 8 illustrating the volume of revolution about the wing tip pod longitudinal axis 17. As can be seen, the forward section I has a smaller diameter than the aft section III with the maximum diameter at section II intermediate sections I and III. The wing tip pod body 8 therefore has a larger proportion of its volume aft of the maximum diameter section II.

In the embodiment described above with reference to FIGS. 5 to 9 the wing tip pod body has a volume of revolution about its longitudinal axis 17 and therefore has a circular section profile shape. As discussed previously, the shape of the wing tip pod body 8 is crucial to achieving the favourable flow conditions for natural laminar flow over the wing upper surface for natural laminar flow.

Figure 10:
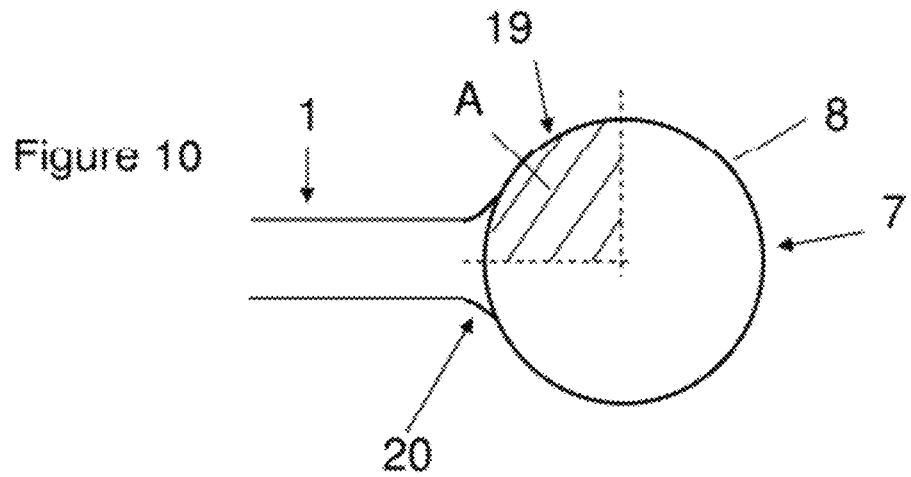
FIG. 10 illustrates generic blends between the wing tip pod and the wing upper and lower surfaces.

With reference to FIG. 10, it has been found that the outer surface 19 of the upper inboard quadrant A of the wing tip pod body shape is particularly important in achieving these desirable flow characteristics. The shape of the outer surface 19 therefore requires particular attention.

Figure 11:
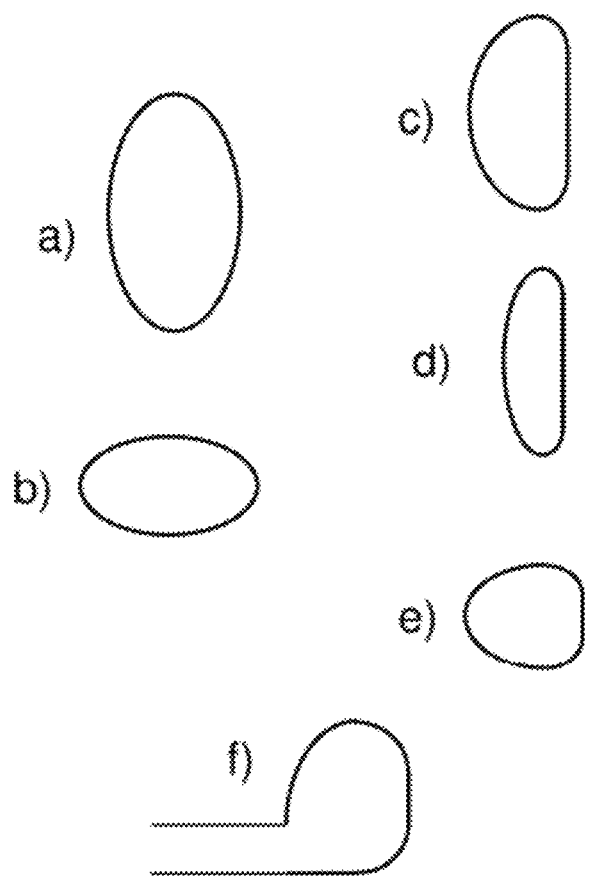
FIGS. 11a-f illustrate various alternative wing tip pod cross sectional profiles.

Whilst in the embodiment described above with reference to FIGS. 5 to 9 the wing tip pod body has a substantially circular sectional shape, other sectional shapes may alternatively be used. For example, FIG. 11a) shows an elliptic section with a substantially vertical major axis; FIG. 11b) shows an elliptic section with a substantially horizontal major axis; FIG. 11c) illustrates a substantially semi circular section with rounded corners; FIG. 11d) illustrates a semi-elliptic section with a substantially vertical major axis and rounded corners; and FIG. 11e) illustrates a semi-elliptic section with a substantially horizontal major axis.

Since the outer surface of the upper inboard quadrant of the wing tip pod body contributes to the primary (first order) flow effects over the wing upper surface in the tip region the wing tip pod body may have a sectional profile substantially corresponding to the upper inboard quadrant of a circular profile only, as shown in FIG. 11f).

The wing tip pod sits in a flow field where a wing tip vortex is present. Due to this, the vortex tends to wrap over the profile shape. It is therefore desirable to select a profile shape that promotes the rotational flow to stay attached for as much of the wing tip pod as possible such that separated flow does not impinge onto the laminar area of the wing. One property of sharp edged (or even low radius) profiles is that they would promote separation of the rotational flow. This is a disadvantage of sharp edged or too highly curved profiles. Accordingly, the profiles shown in FIG. 11 have a minimum radius of curvature sufficiently large to promote attached flow as far forward on the wing tip pod as possible.

Profiles that tend to reduce the overall volume of the wing tip pod will lead to less viscous (or profile) drag being generated due to the pod itself (assuming the viscous improvements on the wing stay the same). So a pod with less volume under the wing and outboard of the nominal circular centreline could benefit in this way so long as no undue flow separations are created. FIG. 11f) illustrates such a pod profile.

The selection of a profile shape (or variation of profile shape) may be linked to the level of aerodynamic load experience by the wing tip pod. For instance, a non-axisymmetric cross-section shape that leads to some positive camber in the chordwise profile may generate higher local loads than an axisymmetric chordwise profile. This could lead to weight penalties and associated performance loss of the aircraft.

Simple, continuous profiles (e.g. constant circular profile) provide advantages of improved manufacturability and associated impact on cost, weight, etc. However, it is not necessary to have a constant profile shape along the entire length of the wing tip pod.

As can be seen from FIG. 10, the wing tip pod profile could be generically blended into the wing profile (e.g. a tangential curve). This could lead to some small flow quality improvements. The generic blending curves 20 shown in FIG. 10 may similarly be employed with any of the alternative profile sectional shapes depicted in FIG. 11, or indeed further alternative wing tip pod body sectional profile shapes which may be used but that are not shown in the Figures.

In general, it is desirable that the nose of the wing tip pod extends only a short distance forward of the wing tip leading edge. In a preferred embodiment the wing tip pod nose extends forward of the wing tip leading edge by less than 20%, and preferably less than 10%, of the wing tip chord. However, under some circumstances it may be necessary to extend the nose of the wing tip pod further forward of the wing tip leading edge so as to counter, for example, flutter effects. The shaping of the aft taper of the wing tip pod between the section of maximum width and the tail is shaped using typical aerodynamic design considerations so as to minimise drag. Importantly, the wing tip pod body has no wasted region.

Although the invention has been described above with reference to one or more preferred embodiments, it will be appreciated that various changes or modifications may be made without departing from the scope of the invention as defined in the appended claims.

The invention claimed is:

1. A natural-laminar-flow swept transonic wing for an aircraft, said wing including an upper surface, a lower surface, a leading edge, a trailing edge, an inboard root and an outboard tip, said wing including a wing tip pod, said pod including an elongate body which tapers forwardly to a nose and tapers rearwardly to a tail, the nose is located forward of the wing tip leading edge and the tail is located aft of the wing tip trailing edge, wherein the pod has a body with a convex outer surface facing said inboard root from an intersection of the pod body and the wing tip upper surface, and the pod body has an edge profile adjacent the wing upper surface extending in plan view in a continuously convex curve from nose to tail and, during flight at a Mach number substantially close to a transonic design point of the wing, a region of natural-laminar-flow over the wing upper surface extends aerodynamically forward of a generally spanwise shock and extends outboard substantially to the wing tip pod where said spanwise shock does not substantially sweep forward toward the wing tip leading edge.

2. A wing according to claim 1, wherein the wing tip pod has a cross-section profile with a minimum radius of curvature sufficiently large to promote attached flow forward on the wing tip pod.

3. A wing according to claim 1, wherein the wing tip pod has a cross-section profile, said cross-section profile has a profile volume and a greater proportion of said profile volume is located above the wing.

4. A wing according to claim 1, wherein the wing tip pod has an asymmetrical cross-section profile, said cross-section profile has a profile volume and said wing tip pod has a centerline located equidistance between inboard and outboard surfaces of said pod, said pod has a greater proportion of said profile volume located outboard of said centerline.

5. A wing according to claim 1, wherein the wing tip pod has a volume aft of the maximum inboard position of the wing tip pod edge profile greater than a volume forward of the maximum inboard position of the wing tip edge profile.

6. A wing according to claim 1, wherein the surface of said wing tip pod is blended with the upper and lower surfaces of the wing.

7. A wing according to claim 1, wherein the wing tip pod has a cross-section shape which varies along the length of the pod.

8. A wing according to claim 1, wherein the maximum inboard position of the wing tip pod edge profile is substantially coincident with the generally spanwise shock feature at the transonic design point.

9. A wing according to claim 1, wherein the maximum inboard position of the wing tip pod edge profile is located between approximately 35% to 70% of the chord of the wing outboard tip.

10. A wing according to claim 1, wherein the wing tip pod has a cross-section profile comprising at least one of a substantially circular and a substantially semi-circular profile.

11. A wing according to claim 1, wherein the wing tip pod has a cross-section profile comprising at least one of a substantially elliptical and a substantially semi-elliptical profile.

12. A wing according to claim 1, wherein the nose of the wing tip pod extends forward of the wing tip leading edge by a distance substantially less than the distance between the wing tip trailing edge and the tail of the wing tip pod.

13. A wing according to claim 1, wherein the nose of the wing tip pod extends forward of the wing tip leading edge by a distance less than 10% of the wing tip chord.

14. An aircraft having the wing according claim 1.

15. A wing according to claim 1, wherein said pod body includes a convex surface extending from said nose to said tail.

16. A wing according to claim 1, wherein the edge profile of the pod body has a maximum inboard position intermediate said wing leading edge and said wing trailing edge.

17. A natural-laminar-flow swept transonic wing for an aircraft, said wing including a span, an upper surface, a leading edge, a trailing edge and an outboard tip, said wing including a wing tip pod attached to said outboard tip, said pod comprising an elongate body which tapers aerodynamically forwardly to a nose and tapers aerodynamically rearwardly to a tail, the nose is located forward of the leading edge and the tail is located aft of the trailing edge, and the pod body has an edge profile adjacent the wing upper surface, said profile extending in plan view from nose to tail in a continuously convex curve and, during flight at a Mach number substantially close to a transonic design point of the wing, a region of natural-laminar-flow over the wing upper surface extends aerodynamically forward of a generally spanwise shock extending outboard substantially up to the wing tip pod, said spanwise shock does not substantially sweep forward toward the wing tip leading edge.

18. In a natural-laminar-flow swept transonic wing for an aircraft, an improvement comprising a wing tip pod, said pod attached to a wing tip at a junction, said pod extending forward of a leading edge of said wing tip, said pod includes an edge profile which, in plan view, has a convex curve at least on a surface of the pod facing an inboard portion of said wing, wherein, during flight at a transonic design point of the wing, a region of natural-laminar-flow over the wing extends aerodynamically forward to the leading edge of the wing from a generally spanwise shock extending outboard to the wing tip pod where said shock does not substantially sweep forward toward the wing tip leading edge.

* * * * *